(12) United States Patent
Schatz et al.

(10) Patent No.: US 9,021,882 B2
(45) Date of Patent: May 5, 2015

(54) ULTRASOUND-BASED MEASURING DEVICE AND METHOD

(75) Inventors: Frank Schatz, Kornwestheim (DE); Juergen Graf, Stuttgart (DE); Gottfried Flik, Leonberg (DE); Georg Bischopink, Pliezhausen (DE); Fabian Henrici, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 483 days.

(21) Appl. No.: 13/329,305

(22) Filed: Dec. 18, 2011

(65) Prior Publication Data
US 2012/0152022 A1    Jun. 21, 2012

(30) Foreign Application Priority Data
Dec. 20, 2010  (DE) .................. 10 2010 063 549

(51) Int. Cl.
*G01N 29/00* (2006.01)
*G01L 11/06* (2006.01)
*G01K 11/22* (2006.01)

(52) U.S. Cl.
CPC ............... *G01L 11/06* (2013.01); *G01K 11/22* (2013.01)

(58) Field of Classification Search
USPC .................... 73/632, 594, 801, 803
See application file for complete search history.

(56) References Cited

U.S. PATENT DOCUMENTS

| | | | |
|---|---|---|---|
| 4,377,087 A * | 3/1983 | Rodot ............................. | 73/594 |
| 4,563,993 A * | 1/1986 | Yamauchi et al. .............. | 123/478 |
| 4,567,765 A * | 2/1986 | Rao et al. ....................... | 73/594 |
| 4,602,511 A * | 7/1986 | Holt ............................... | 73/581 |
| 4,974,780 A * | 12/1990 | Nakamura et al. ............ | 239/102.2 |
| 5,485,751 A * | 1/1996 | Karbach et al. ................ | 73/618 |
| 6,112,599 A * | 9/2000 | Maki ............................... | 73/801 |
| 6,941,231 B2 * | 9/2005 | Zeroug et al. ................... | 702/39 |
| 7,089,816 B2 * | 8/2006 | Hakimuddin .................. | 73/866 |
| 7,191,663 B2 * | 3/2007 | Go Boncan et al. ........... | 73/803 |
| 7,677,104 B2 * | 3/2010 | Maki et al. ..................... | 73/632 |
| 7,942,064 B2 * | 5/2011 | Maki, Jr. ........................ | 73/803 |
| 2006/0157141 A1 * | 7/2006 | von Hayn et al. .............. | 141/95 |

FOREIGN PATENT DOCUMENTS

| | | | |
|---|---|---|---|
| DE | 280605 | * | 7/1990 |
| DE | 41 20 397 A1 | | 12/1992 |
| DE | 10 2007 010 200 B3 | | 4/2008 |

* cited by examiner

*Primary Examiner* — J M Saint Surin
(74) *Attorney, Agent, or Firm* — Maginot, Moore & Beck LLP

(57) ABSTRACT

An ultrasound-based measuring device includes a measurement body, at least one ultrasonic transmitter for coupling ultrasonic measurement signals into the measurement body, and at least one ultrasonic receiver for detecting the ultrasonic measurement signals reflected at an end face of the measurement body. The at least one ultrasonic transmitter emits both a longitudinal and a transverse measurement signal. The influence of a physical disturbance variable on the measurement section traversed by the measurement signals during a determination of a measurement pressure prevailing at the end face and/or of a measurement temperature prevailing at the end face can be taken into account on the basis of the propagation times and a difference between the propagation times of the longitudinal and transverse measurement signals reflected at the end face.

14 Claims, 1 Drawing Sheet

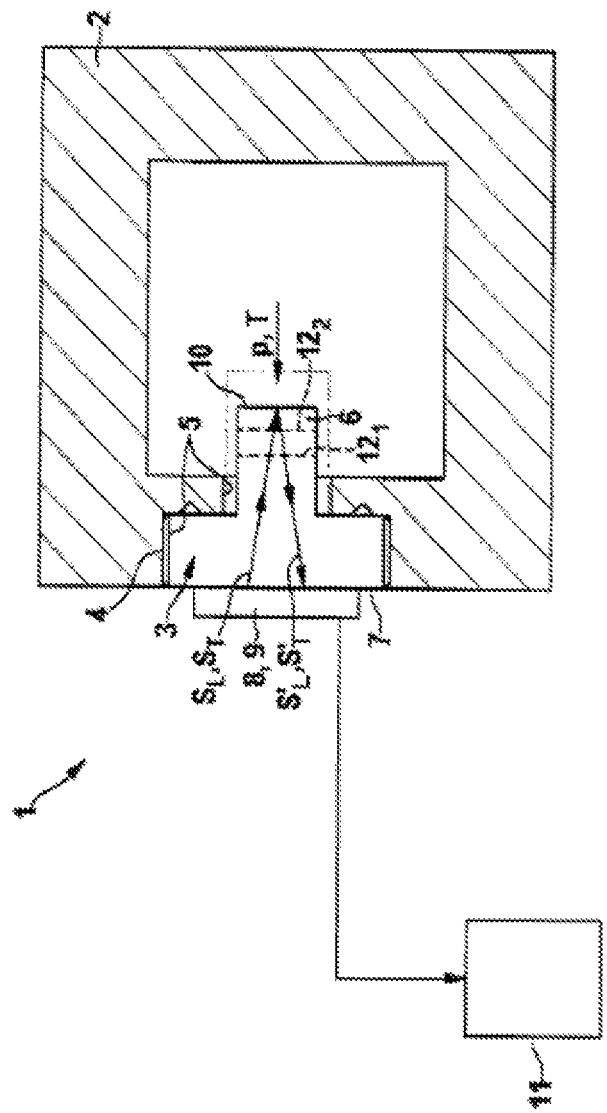

ULTRASOUND-BASED MEASURING DEVICE AND METHOD

This application claims priority under 35 U.S.C. §119 to patent application no. DE 10 2010 063 549.9, filed on Dec. 20, 2010 in Germany, the disclosure of which is incorporated herein by reference in its entirety.

BACKGROUND

The disclosure relates to an ultrasound-based measuring device and also to an ultrasound-based measuring method.

The use of ultrasound for determining the length e.g. of a solid body is known in practice for a multitude of issues, such as, for instance, in the field of nondestructive material testing. In many cases the so-called pulse echo method is used here, in which the length of a measurement body is deduced from the propagation time between emission of an ultrasonic pulse into the measurement body and reception of the pulse echo reflected e.g. at the rear wall of said measurement body.

For this purpose, a precision time base is required as reference for the time measurement, wherein in practice quartz-crystal oscillators are principally used in this regard. Moreover, the sound speed in the body to be examined has to be known, or has to be determined by a reference measurement on a body of known length and of the same material.

In all propagation-time-based distance measurements the temperature response is problematic, however, since it can exceed the effect actually to be measured by a multiple, as a result of which the measurement variable can occasionally be corrupted to the extent of being unusable.

Therefore, in many applications, the temperature of the measurement body has to be determined accurately to a tenth or hundredth of a degree. Guaranteeing this measurement accuracy in the context of unavoidable fluctuations of manufacturing parameters over the entire service life of a temperature measuring device is practically impossible or possible only with untenable costs.

Against this background, it is an object of the present disclosure to develop a generic measuring device and a generic measuring method to the effect that a length measurement independent of temperature-dictated measurement section or propagation time changes in the ultrasonic signals is made possible in a simple and cost-effective manner.

SUMMARY

This object is achieved according to the disclosure by a measuring device having the features set forth below.

According to the disclosure, the longitudinal and transverse ultrasonic signals traverse the measurement section to which the pressure to be measured is applied. Since the acousto-elastic effect (influence of the mechanical stress, that is to say pressure, on the sound propagation speed) differs in magnitude in the case of longitudinal and transverse ultrasonic waves, two independent measurements (propagation time) are obtained for the same measurement pressure. This allows the disturbing influence of the temperature along the measurement section that is identical for both ultrasonic signals (provided that this section is covered by both ultrasonic signals virtually simultaneously) to be calculated out of the measurement result. From the longitudinal and transverse propagation times, the temperature and/or pressure at the end face can be determined by means of a set of characteristic curves.

Pressure-dictated propagation time changes in the ultrasonic signals over the measurement section can thus be detected independently of the temperature response of the measurement section, as a result of which a temperature-compensated and therefore reliable determination of the measurement pressure is possible. As a result, it is possible even to detect very small pressure-dictated deformations in a wide temperature range, such as occur for example in the field of motor vehicle technology with temperatures of minus 40° to plus 150° C. that are typically to be encountered there. In this respect, in particular, applications in the measurement of the operating medium pressure of an injection system (e.g. common rail) or of the hydraulic system of a brake system are also possible.

The measuring device according to the disclosure has, in particular, the following advantages:
- highly accurate temperature compensation with low additional outlay;
- only single-point temperature adjustment necessary;
- a precise pressure and temperature measurement is additionally obtained.

The measuring device according to the disclosure preferably comprises an evaluation unit, which, on the basis of the propagation times and a difference between the propagation times of the longitudinal and transverse measurement signals reflected at the end face, calculates the influence of the temperature on the measurement section traversed by the measurement signals and, given known longitudinal and transverse sound speeds of the measurement body, by means of corresponding pressure and/or temperature reference curves (sets of characteristic curves), determines the measurement pressure prevailing at the end face and/or the measurement temperature prevailing at the end face.

In a further aspect, the disclosure also relates to an associated ultrasonic measuring method for determining a measurement pressure and/or measurement temperature prevailing at the measurement body by means of pulse echo comprising the features of claim 9. In order that the same measurement section is traversed, the longitudinal and transverse ultrasonic signals are preferably emitted as far as possible simultaneously or at least virtually simultaneously.

Further advantages and advantageous configurations of the subject matter of the disclosure can be gathered from the description, the drawing and the claims.

BRIEF DESCRIPTION OF THE DRAWING

The disclosure is explained in greater detail below on the basis of an exemplary embodiment represented highly schematically in the drawing.

The single FIG. 1 shows a highly schematic longitudinal section of an ultrasound-based measuring device according to the disclosure for determining the pressure prevailing in a high-pressure container.

DETAILED DESCRIPTION

The ultrasound-based measuring device 1 shown in FIG. 1 serves for indirectly measuring the pressure p and/or temperature T prevailing in a pressure container 2. The pressure container 2 can be, for example, a fuel high-pressure accumulator (common rail) of a fuel injection system for internal combustion engines, in which the operating pressure is usually far above 2000 bar, or a hydraulic pressure container of a hydraulic system of a brake system.

The measuring device 1 has a substantially helical measurement body 3 composed of an expedient material, e.g. metal or plastic, which is screwed in pressure-tight fashion by an external thread fixing section 4 into a container opening 5 of the pressure container 2, said container opening being provided with a thread, and extends with a free measurement end 6 through the container opening 5 into the pressure container 2. The measurement end 6 is therefore subjected to the operating pressure p prevailing in the pressure container 2 and is thereby deformed relative to its pressureless initial state, indicated by dashed lines.

An ultrasonic transmitter 8 for coupling longitudinal and transverse ultrasonic signals $S_L$, $S_T$ into the measurement body 3 and an ultrasonic receiver 9 for detecting the ultrasonic measurement signals $S_L'$, $S_T'$ reflected at the end face 10 of the measurement end 6 are arranged at the end face 7 of the measurement body 3 that is remote from the free measurement end 6. Ultrasonic transmitter and ultrasonic receiver 8, 9 can be formed jointly by a single ultrasonic transducer.

The measurement propagation time that is measured of a measurement signal reflected at the measurement end 6 subjected to pressure is dependent on the temperature of the measurement section traversed and the pressure p prevailing at the end face 10. Since the acousto-elastic effect (influence of the mechanical stress, that is to say pressure p, on the sound propagation speed) differs in magnitude in the case of longitudinal and transverse ultrasonic waves, with the longitudinal and transverse ultrasonic signals $S_L$, $S_T$ two independent propagation time measurements are obtained for the same pressure p. This allows the disturbing influence of the temperature along the measurement section that is identical for both ultrasonic signals (provided that this section is covered by both ultrasonic signals simultaneously or virtually simultaneously) to be calculated out of the measurement result. Pressure-dictated propagation time changes in the ultrasonic signals over the measurement section can thus be detected independently of the temperature response of the measurement section.

An evaluation unit 11 is connected to the ultrasonic transducer, which evaluation unit, on the basis of the measured propagation times and a difference between the propagation times of the reflected longitudinal and transverse measurement signals $S_L'$, $S_T'$, given known longitudinal and transverse sound speeds of the measurement body 3, determines the measurement pressure p by means of a measurement pressure reference curve (set of characteristic curves). Analogously, the measurement temperature T prevailing at the measurement end 6 can also be determined by means of a temperature reference curve (set of characteristic curves).

As indicated by dashed lines in FIG. 1, the measurement body 3 can have one or more reference areas 12$_1$, 12$_2$, at each of which a portion of the ultrasonic signals emitted by the ultrasonic transmitter 8 are reflected as reference signals back to the ultrasonic receiver 9. The reference areas 12$_1$, 12$_2$ can be formed for example by an insertion or an edge in the measurement body 3. By forming the difference between the longitudinal and the transverse propagation times of the echoes from the end face 10 and the respective reference area 12$_1$, 12$_2$, it is possible to measure the pressure p and the temperature T in the intervening region; therefore, no integration of these measurement variables takes place over the entire length of the measurement body 3.

In order to minimize the influence of mounting stress on the measurement section, the measurement body 3 can have a flange which is braced by means of a tensioning screw in a container opening 5 and from which the measurement end 6 of the measurement body 3 is additionally offset by means of a shoulder.

The measurement end 6 can also project very far into the pressure container 2 in order to measure the temperature T and/or pressure p in the center of the pressure container 2, for example, instead of at the edge as shown in FIG. 1. If a plurality of reference areas 12$_1$, 12$_2$ are distributed over the length of the measurement end 6, then the pressure and/or the temperature at a plurality of locations within the pressure container 2 simultaneously can be measured by means of suitably forming the difference between propagation times.

What is claimed is:

1. An ultrasound-based measuring device, comprising:
a measurement body defining an end face;
at least one ultrasonic transmitter configured to couple ultrasonic measurement signals into the measurement body, wherein the at least one ultrasonic transmitter is configured to emit both a longitudinal measurement signal and a transverse measurement signal;
at least one ultrasonic receiver configured to detect the ultrasonic measurement signals reflected at the end face of the measurement body; and
an evaluation unit which, on the basis of the propagation times and a difference between the propagation times of the longitudinal and transverse measurement signals reflected at the end face, takes account of the influence of a physical disturbance variable on the measurement section traversed by the measurement signals during the determination of a measurement pressure prevailing at the end face and/or a measurement temperature prevailing at the end face.

2. The measuring device according to claim 1, wherein the measurement body has at least one reference area at which a portion of the measurement signals emitted by the ultrasonic transmitter is reflected as reference signals back to the ultrasonic receiver.

3. The measuring device according to claim 1, wherein the measurement body has a plurality of reference surfaces which are distributed over the length of the measurement body and at each of which a portion of the measurement signals emitted by the ultrasonic transmitter is reflected as reference signals back to the ultrasonic receiver.

4. The measuring device according to claim 1, wherein the evaluation unit, on the basis of the differences in the propagation times between longitudinal and transverse measurement signals reflected at the end face and at at least one reference area, determines the prevailing measurement pressure and/or the prevailing measurement temperature between the end face and the at least one reference area.

5. The measuring device according to claim 1, wherein the evaluation unit, on the basis of the differences in the propagation times between longitudinal and transverse measurement signals reflected at the end face and a plurality of reference areas distributed over the length of the measurement body, determines the prevailing measurement pressure and/or the prevailing measurement temperature at a plurality of points of the measurement body.

6. The measuring device according to claim 1, wherein the ultrasonic transmitter is configured such that the longitudinal measurement signal and the transverse measurement signal emitted are influenced differently by a pressure in the measurement body.

7. A system, comprising:
a pressure container; and
a measuring device including (i) a measurement body having a measurement end portion defining an end face, (ii) at least one ultrasonic transmitter configured to couple ultrasonic measurement signals into the measurement body, (iii) at least one ultrasonic receiver configured to detect the ultrasonic measurement signals reflected at the end face of the measurement body, and (iv) an evaluation unit which, on the basis of the propagation times and a difference between the propagation times of the longitudinal and transverse measurement signals reflected at the end face, takes account of the influence of a physical disturbance variable on the measurement section traversed by the measurement signals during the determination of a measurement pressure prevailing at the end face and/or a measurement temperature prevailing at the end face, wherein the at least one ultrasonic transmitter is configured to emit both a longitudinal measurement signal and a transverse measurement signal, and wherein the measurement body is configured and arranged so that the measurement end portion with the end face is located in the pressure container.

8. The system according to claim 7, wherein the measurement end portion of the measurement body is arranged so as to be (i) subjected to a pressure prevailing in the pressure container and/or (ii) exposed to a temperature prevailing in the pressure container.

9. An ultrasonic measuring method for determining a measurement pressure and/or measurement temperature prevailing at a measurement body by use of pulse echo, wherein the propagation time of an ultrasonic measurement signal coupled into the measurement body until the reception of the ultrasonic measurement signal reflected at an end face of the measurement body is measured, wherein longitudinal and a transverse measurement signals are emitted, and wherein the influence of a physical disturbance variable on the measurement section traversed by the measurement signals during a calculation of a measurement pressure prevailing at the end face and/or of a measurement temperature prevailing at the end face is taken into account on the basis of the propagation times and a difference between the propagation times of the longitudinal and transverse measurement signals reflected at the end face.

10. The ultrasonic measuring method according to claim 9, wherein, on the basis of the differences in the propagation times between longitudinal and transverse measurement signals reflected at the end face and at at least one reference area, the prevailing measurement pressure and/or the prevailing measurement temperature between the end face and the at least one reference area is determined.

11. The ultrasonic measuring method according to claim 9, wherein, on the basis of the differences in the propagation times between longitudinal and transverse measurement signals reflected at the end face and a plurality of reference areas distributed over the length of the measurement body, the prevailing measurement pressure and/or the prevailing measurement temperature at a plurality of points of the measurement body is determined.

12. The system of claim 7, wherein the system is a fuel injection system.

13. The system of claim 7, wherein the system is a hydraulic system of a brake system.

14. The system of claim 7, wherein the ultrasonic transmitter is configured such that the longitudinal measurement signal and the transverse measurement signal emitted are influenced differently by a pressure in the measurement body.

* * * * *